Sept. 1, 1931.  W. G. WILSON  1,821,863
FLUID TIGHT JOINT AND METHOD OF MAKING
Filed Nov. 1, 1929
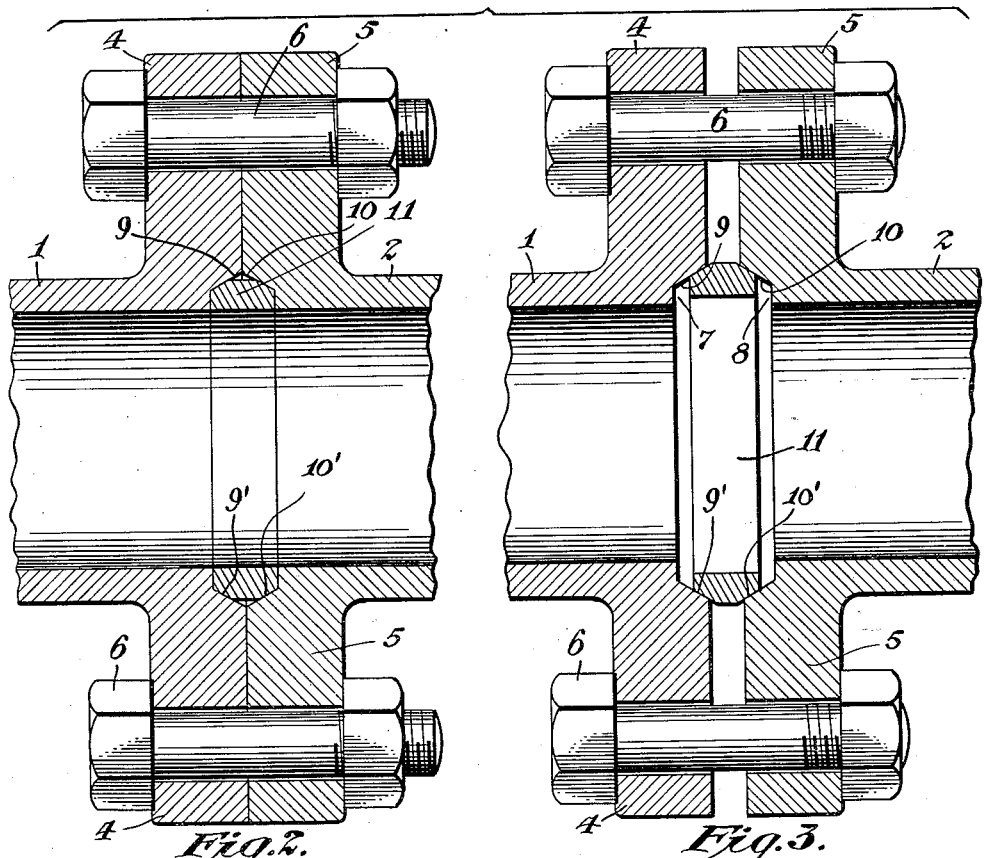
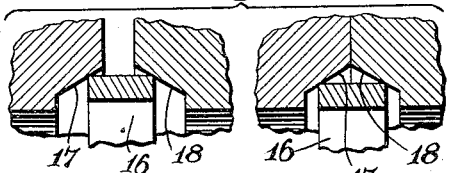
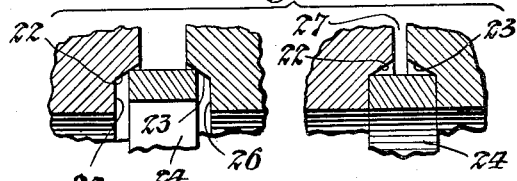
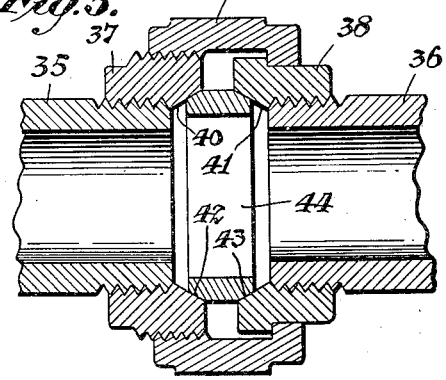
Inventor
Wylie G. Wilson
By his Attorney Patented Sept. 1, 1931

1,821,863

UNITED STATES PATENT OFFICE

WYLIE G. WILSON, OF ELIZABETH, NEW JERSEY

FLUID TIGHT JOINT AND METHOD OF MAKING

Application filed November 1, 1929. Serial No. 403,976.

This invention relates to a fluid tight joint and to the method of making the same. The joint is particularly useful in connecting together sections of metal pipe or conduits used to transmit fluids under pressure and hence it will be described in that connection. It will be obvious, however, that the invention may be used in other connections.

Heretofore in the art, pipes have usually been joined by simple threaded sleeves, or by constructions involving more or less plastic gaskets or accurately ground abutting surfaces. Simple threaded sleeves are not customarily used for large sizes of pipe because of the difficulty of making a leak tight joint and the difficulty of rotating the pipe in making the joint; also joints made with simple threaded sleeves have a rough interior. Gaskets of more or less plastic material are apt to be blown out by high pressures; they deteriorate with age and heat; and in many cases great force must be used in clamping together the parts with which the gasket is associated. Accurately ground abutting surfaces are expensive to manufacture and are not suitable in many cases. Other types of joints have been proposed, but the types above referred to are the ones that are most extensively used.

The general object of the present invention is to provide a joint structure and/or method of making a joint which will withstand high fluid pressure and can be manufactured at low cost by ordinary commercial methods.

Another object of the invention is to provide a joint structure and method of making a joint which will withstand high fluid pressure without requiring greater manufacturing precision or greater care in assembly than is involved in ordinary commercial work.

Other objects of the invention will be obvious from the following disclosure.

In accordance with the above and other objects of the invention, various difficulties of the prior art are overcome by a construction in which two pieces of pipe or the like that are to be joined have their ends so recessed that the side wall of the recess forms a tapered annular sealing surface. The two ends are assembled with the recesses in alignment, and a sealing ring of suitable material, preferably metal, and preferably resilient metal, is placed in the recesses so that each tapered sealing wall on the pipe ends engages the ring. The pipe ends are drawn together thus causing sliding movement between the sealing walls on the pipe ends and the sealing ring, which movement laps the sealing walls into sealing fit with the ring and circumferentially contracts the ring as a unit, thereby setting up a heavy permanent sealing pressure between the ring and the annular sealing surface on the pipe. When fluid under pressure is placed in the pipe, it tends to expand the ring, thus adding to the sealing pressure between the ring and the sealing surfaces on the pipe ends or the like.

Fig. 1 of the drawings is a longitudinal section of a pipe joint in accordance with the present invention, the right-hand part of the figure showing the parts assembled preparatory to forming the joint, and the left-hand part of the figure showing the completed joint.

Fig. 2 is a fragmentary detail section showing a modified form of the invention.

Fig. 3 is a fragmentary detail section showing a second modification of the invention.

Fig. 4 is a fragmentary detail view showing a third modification of the invention.

Fig. 5 is a longitudinal sectional view showing the invention applied to a conventional pipe union.

In Fig. 1 sections of pipe 1 and 2 that are to be joined are provided with ends of fittings having annular flanges 4 and 5 adapted to be drawn together by bolts 6 as is well understood in the art. The pipe ends are provided with annular recesses at 7 and 8 which have annular tapered side walls 9 and 10. The tapered walls 9 and 10 may be conical in form and they are adapted to engage complementary tapered surfaces 9' and 10' on a sealing ring 11. The sealing ring 11 is preferably of resilient material and may be formed of metal similar in character to the metal of the pipe. The metal of the ring is preferably resilient and preferably is malleable, ductile, or worked metal. The ring is so proportioned that upon being constricted with sufficient force it contracts circumferentially as a unit. In its normal state (i. e. unconstricted) the interior diameter of the ring 11 is preferably larger than the interior diameter of the pipe, as shown in the right-hand portion of Fig. 1.

The joint is assembled with the parts in the positions shown in the right-hand portion of Fig. 1. The flanges 4 and 5 are then drawn toward one another by the bolts 6. This movement causes pressure to be exerted between the tapered walls 9 and 10 of the pipe and the tapered surfaces 9' and 10' on the sealing ring. This pressure continues to be exerted and somewhat increases in value as the walls 9 and 10 slide over the surfaces 9' and 10'. This sliding of the surfaces under high pressure causes local action on the metal of the sliding surface which is in effect a local cold working. This local action so removes machining irregularities as to produce a sealing fit capable of withstanding high pressures. For convenience this local action by which the sealing fit is produced will be referred to as a lapping action. The circumferential pressure on the ring also so constricts the ring that the entire ring is contracted as a unit. The ring resists contraction and thus sealing pressure is established on the walls 9 and 10. Preferably the metal of the ring is resilient and this resiliency insures the maintenance of the sealing pressure even under expansion and contraction of the parts due to temperature changes. When I say the ring is contracted as a unit I mean that the ring is contracted throughout its entire length (measured axially of the pipe). In fact, in actual practice with a ring of the proportions shown in the drawings the geometrical configuration of the ring's cross section (taken as in the drawings) is maintained insofar as the eye can detect, but the entire circumference of the ring is reduced. In such a case the geometrical change in the ring in actual practice is similar in kind (not necessarily degree) to the geometrical change caused by a decrease in temperature of the ring.

In the finished joint the flanges 4 and 5 are preferably in contact, as shown in Fig. 1 and the sealing ring 11 has preferably been so contracted that its interior surface is flush with the interior surface of the pipe. The flanges 4 and 5 form a rigid mechanical connection between the two sections of pipe so that any bending stresses which may be put upon the pipe are resisted at the joint by the bolted flanges and hence such stresses cannot impair the seal. The interior of the ring 11 being flush with the interior of the pipe no crevices are left to induce eddy currents and impede the flow through the pipe. Also there is no place for residue or other material to lodge at the joint.

In Fig. 2 the ends of the pipe are recessed in much the same manner as in Fig. 1 and the ends may be drawn together by any suitable means such as flanges and bolts shown in Fig. 1. A sealing ring 16 is provided which has a normal internal diameter preferably greater than the internal diameter of the pipe. The cross section of the ring is substantially rectangular, as shown in the drawing. The parts are initially assembled as shown in the left-hand portion of Fig. 2 so that the annular side walls 17 and 18 of the recesses in the pipe ends engage the more or less square corners of the sealing ring. Accordingly, there is substantially a line contact between the sealing ring and each of the surfaces 17 and 18. As the pipe ends are drawn together the surfaces 17 and 18 slide over the corners of the ring and produce a constricting pressure upon the ring. This sliding movement produces a lapped sealing fit between the corners of the ring and the surfaces 17 and 18; and when the movement is completed the ring is contracted to the condition shown in the right-hand part of Fig. 2, in which its internal diameter is substantially equal to the internal diameter of the pipe. The resiliency of the ring urges the ring outwardly with great force and since there is only a small area of contact between the corners of the ring and the surfaces 17 and 18, the sealing pressure per unit area of the contacting surfaces is very high.

The construction shown in Fig. 3 is similar to that shown in Fig. 2, but the depths of the recesses in the pipe ends is slightly less than half the axial length of the ring. The parts are initially assembled as shown in the left-hand portion of Fig. 3 and then, as the ends of the pipe are drawn together, the tapered walls 22 and 23 are lapped into sealing contact with the corners of the ring 24 and the ring is circumferentially contracted as in Fig. 2. Due to the smaller depth of the recesses in the pipe ends the bottoms 25 and 26 of the recesses in the pipe ends are drawn into contact with the ends of the ring, leaving a small space 27 between the ends of the pipe. Preferably, the completed joints has the ring 24 so contracted that its internal diameter is flush with the interior of the pipe so that there is no change in size of the conduit and no crevices at the joint. With this construction a certain amount of seal is also produced between the ends of the sealing ring and the bottoms 25 and 26 of the recesses.

The construction shown in Fig. 4 is similar to that shown in Fig. 1 except that the depth of the recesses is so related to the length of the sealing ring 28 that there is a small space 29 left between the ends of the pipe when the joint is completed. In other words, the final position of the parts in the completed seat is determined by the engagement of the bottoms 30 and 31 of the recesses with the ends of the sealing ring 28. Both this construction and the construction of Fig. 3 allows for manufacturing variations in that the bottoms of the recesses can always be drawn against the ends of the sealing ring 28. Thus crevices at the joint are avoided and a certain amount of seal is obtained at the end surfaces of the ring.

In Fig. 5 the sections of pipe 35 and 36 are provided with screw threaded fittings 37 and 38 adapted to be drawn together by a nut 39, as is usual in a pipe union. The fittings 37 and 38 are provided with conical faces 40 and 41 which are adapted to engage complementary sloping faces 42 and 43 of a sealing ring 44 of the same type as the sealing ring shown in Fig. 1. When the parts are initially assembled they are in the position shown in Fig. 5; and then as nut 39 is tightened the sloping walls 40 and 41 are lapped into sealing engagement with the faces 42 and 43 on the sealing ring, and the ring is contracted as a unit in the same manner as in Fig. 1.

The wedging action which is exerted on the sealing ring as the joint is drawn up is one which has great mechanical advantage, and hence large sealing pressures may be exerted with relatively small forces applied by the bolts 6 or other means used to draw the pipe ends together. The amount of the mechanical advantage obtained depends, of course, upon the angle of the sloping surfaces. If a small angle be used (i. e. measured from the axis of the pipe) a large mechanical advantage is obtained, but the sealing ring must have a relatively long length and the ends of the pipe must be moved a relatively large distance in order to obtain a given contraction of the ring. On the other hand, if the angle of the sloping surfaces be large, the conditions are just the reverse. An angle should be used which best suits the particular purpose, but I have found that for many purposes an angle of 16 degrees is satisfactory, as it is very desirable that the sealing ring be relatively short measured axially of the pipe.

In practice, there is a maximum permissible pull which can be exerted by the bolts, and hence there is a corresponding limit to the cross sectional area of the sealing ring. In other words, if the cross sectional area of the ring be too great, the maximum permissible pull of the bolts will not be sufficient to effect the contraction of the ring. Hence making the ring short enables it to be made thick, and a thick ring will withstand higher pipe pressure than a thin ring. The length of the ring and the angle of the sealing surface should be such as to take care of manufacturing variations in the size of the rings and the size of the pipe ends, i. e., to insure that the parts will readily start together, and that complete drawing up of the pipe end will effect sufficient contraction of the ring and adequate lapping of the sealing surfaces. Of course, the angle of the surfaces should not be so steep as to prevent pulling up of the pipe ends without damaging the sealing surfaces.

As the parts are assembled preparatory to drawing up the joint the sealing ring is floating and acts to automatically align the pipe ends with each other and with the sealing ring. The contacting surfaces are so effectively lapped into a sealing fit that ordinary commercial machining methods are sufficiently accurate in making the parts, and the joint does not require great care in manufacturing or in assembling. In fact, in actual practice a fluid tight seal is obtained by the time a fraction of the lapping movement has been completed.

The exact dimensions and material of the sealing ring are not important so long as they are such as to permit the ring to act as above described. In general, the material of the ring must have compressive strength and elasticity and is preferably a ductile or malleable or worked metal similar to or somewhat softer than the pipes to be joined. Thus a steel ring is preferably used for steel pipe and a brass ring for brass pipe. The material of the ring and its cross sectional proportions (i. e. axial length to cross axial thickness) are such that the ring contracts as a unit when constricted, as has previously been pointed out, but the exact proportions and dimensions may be varied considerably. The ring may have a thickness slightly less than the thickness of the pipe and a length slightly greater than twice its thickness. As shown in the drawings, the ends of the pipe are preferably reenforced, as by the flanges 4 and 5 or fittings 37 and 38, so that the pipe ends remain a fixed size as the joint is drawn together and the sealing ring contracted.

It will be obvious that factors entering into the construction and operation of the described devices will in most cases have to be empirically determined in view of the necessities of particular cases. For example, where my invention is embodied in a pipe joint assembly or the like the pipe diameter, structural strength and pipe material, must be considered in making specifications for the ring. In general, rings made of such brittle material, as, for example, ordinary cast iron; or such soft material as ordinary lead, are not suitable. Other factors are (1) diameter of ring; (2) wall thickness; (3) length unconstrained and possibly relation of length under constraint to unconstrained length; (4) angle of surface on ring through which diameter-changing force is made effective; (5) time taken in accomplishing diameter-changing operation; and (6) friction between ring and cooperating elements.

My experience leads me to believe that the following statements are correct:

In the case of a ring of small diameter the length of the ring and the thickness of its circumferential wall should be about the same. As the diameter of the ring increases the length of the ring in relation to the thickness of its circumferential wall may also increase. Also the thicker the circumferential wall is the longer the ring may be. For very small rings the length of the ring and the thickness of its circumferential wall should be about the same. The length of the ring may be increased for the same wall thickness if its diameter is increased, and also the length of the ring may be increased as the thickness of its circumferential wall is increased.

The angle of the constraining face (factor 4) contains in some degrees the time element but it also contains another element. The force applied to the tube from the sloping face can be resolved (in the well known and customary fashion) into two component forces, one acting axially of the ring and the other acting at right angles to the axis of the ring. If the force acting axially of the ring is the major component then the major effect will be to cause the ring to buckle (this effect being assisted by the right angle component) rather than contract as a whole. If the two components are equal then there will still be a most emphatic buckling effect as well as contracting effect and, as the resistance of the end of the ring in contact with the sloped face to movement at right angles to the axis depends upon the ease with which that end can thus move, it is obvious that the greater the axial component is, the greater will be the tendency of the ring to buckle instead of to contract as a whole. Therefore cross axial component must be greater than axial component and the angle must be less than 45°. If this reasoning be correct then it would follow that within limits the more gentle the slope that is to say the less the axial component in relation to the cross axial component) the greater the unconstrained length (factor 3) of a ring might be. As a matter of fact this is what seems to happen.

For example. If two duplicate rings may be taken, each of the same circumferential wall section, the same diameter and the same material, and one of them be placed in an apparatus as illustrated with faces which slope at an angle of 16 degrees to the axis of the ring and the tapered surfaces be moved axially of the ring to contract it and the ring be of such a length that, with a 16 degree angle, the ends in contact with the sloping surface contract more than the unconstrained part of the ring, thus producing a cone shape ring; the duplicate ring if put into a duplicate apparatus with a slope of two degrees will contract not only as a unit but will contract without practical change in form, emerging as a cylindrical ring with its circumferential wall practically parallel to the axis just as it was before contraction.

The following conclusions emerge.

Assuming that we take apparatus with the angle of the contracting surface the same in every case, and the time taken in performing the diameter-changing operation roughly similar, as would be the case in tightening up screws or the like or using a power press:

For a ring of given diameter, the thicker the wall the greater the length may be.

For a ring of given thickness, the greater the diameter the greater the length may be.

For a ring of given length, the greater the diameter the less the thickness need be.

Also, broadly speaking, for a ring of given diameter the less the angle (slope of contracting surface) the less the thickness need be or the greater length may be.

If it is desired to contract a ring with minimum possible change not only in shape but also in actual dimensions of circumferential wall section, then the proportions of the ring, and the slope, and the area of the pressure-receiving surface and the conditions affecting the coefficient of friction between that surface and the ring, and the time taken to perform the operation of changing diameter, must all be taken into consideration much more carefully than if it be desired merely to change the diameter of the ring as a whole without regard to whether the amount of change of diameter of the unconstrained portion is exactly the same as the amount of change of diameter of the constrained portion.

From what has been said regarding the components of the diameter-changing force it will be obvious that the coefficient of friction between the contracting surface and the ring is also an important factor. Under every condition it is desirable to keep this coefficient as low as possible, to which end it is desirable that the surface in contact be lubricated and that the surfaces themselves be smooth, in fact as smooth as possible.

In order merely to produce such changes of diameter as are normally desirable with such rings as are suitable for a vast multitude of uses, no necessity exists for particular smoothness of the contacting surfaces. So long as the surfaces in contact are reasonably smooth and free from irregularities of a friction producing nature a wide variety of angle of the contracting surface may be used with success to produce the desired change of diameter throughout the length of the ring.

The area of contact of the particles of the ring directly subjected to pressure, with the particles of the ring subjected to that pressure only through the internal adhesion of the particles of the ring, seems to have a definite effect upon the result. It seems only reasonable that it should be so, because nothing except this reluctance of the particles to slip past each other can produce contraction of the portion of the ring not directly subjected to pressure.

As indicated, I have obtained excellent results with a ring of cross-section as shown in which all the corner angles are 90° or more; and force is applied to the ring exteriorly thereof at a point or points farther from the midlength of the ring than is the circle which constitutes or is in the outer circumferential boundary of the ring. And in general it is true that the thickness of ring which will change in diameter substantially without change in the cross-sectional shape of the ring depends, for the same material and angle of application of force, upon the extent of the length of the ring which is unsupported by the force-applying surface; the greater the length of the unsupported surface, the thicker the ring must be.

The invention may assume forms other than those specifically disclosed and may be used in connections other than those specifically disclosed. Accordingly, the present disclosure is to be considered as illustrative in compliance with the patent statutes and is not to be considered as limiting.

Having described my invention, what I claim is:

1. The combination of two elements to be joined, one of which is a solid ring of metal resistant to change of form and possessing ductility and of substantial thickness throughout its length, each element having a substantially circular continuous cooperative contact portion, at least one of which contact portions is a sloping surface along which the other contact portion rides upon contact of the portions and during the drawing together of the elements, means for applying force axially of the elements to draw and hold them together, the distribution of the mass of the ring relative to the length thereof, the internal structure of the ring and the angularity of the sloping surface being such that the force applied is resolved into axial and cross-axial components, to which components the resistance to bending of each and every elemental cross-axial section of the ring is greater than the resistance to decrease of diameter of the ring substantially as a unit, whereby the ring decreases in diameter substantially as a unit, making and maintaining a sealed joint between the contact portions.

2. The combination of two elements to be joined, one of which is a solid ring of metal resistant to change of form and possessing ductility and of substantial thickness throughout its length, the said elements having corresponding substantially circular continuous cooperative contact portions, said contact portions being sloping surfaces along one of which the other rides upon contact of the portions and during the drawing together of the elements, means for applying force axially of the elements to draw and hold them together, the distribution of the mass of the ring relative to the length thereof, the internal structure of the ring and the angularity of the sloping surfaces being such that the force applied is resolved into axial and cross-axial components, to which components the resistance to bending of each and every elemental cross-axial section of the ring is greater than the resistance to decrease of diameter of the ring substantially as a unit, whereby the ring decreases in diameter substantially as a unit, making and maintaining a sealed joint between the sloping contact surfaces.

3. The combination with two elements to be joined, having tubular ends, of a solid ring of metal resistant to change of form and possessing ductility and of substantial thickness throughout its length, said ring being interposed between the ends of the elements, each element having a substantially circular continuous contact portion, said ring having a pair of substantially circular continuous contact portions for cooperative contact, one each with the contact portions of said elements, at least one portion of each pair of contacting portions being a sloping surface along which the other portion of the pair rides during the drawing of the elements toward each other, means for applying force axially of the elements to draw them and to hold them drawn toward each other, the distribution of the mass of the ring relative to the length thereof, the internal structure of the ring and the angularity of the sloping surface being such that the force applied is resolved into axial and cross-axial components, to which components the resistance to bending of each and every elemental cross-axial section of the ring is greater than the resistance to decrease of diameter of the ring substantially as a unit whereby the ring decreases in diameter substantially as a unit, making and maintaining a sealed joint between the contact portions of the ring and the contact portions of the elements.

4. The combination set forth in claim 3 in which the ring is of general rectangular cross-section with the outer corners thereof cut away to produce sloping surfaces.

5. The combination of two elements to be joined, one of which is a solid ring of metal resistant to change of form, and possessing ductility and of substantial thickness throughout its length, the other element being provided with a tubular end, each element having a substantially circular continuous contact portion, at least one of which contact portions is a sloping surface along which the other portion rides upon contact of the portions and during the drawing together of the elements, the diameter of the bore of the ring being initially greater than the diameter of the bore of the tubular end of the other element, means for applying force axially of the elements to draw and to hold them together, the distribution of the mass of the ring relative to the length thereof, the internal structure of the ring and the angularity of the sloping surface being such that the force applied is resolved into axial and cross-axial components, to which components the resistance to bending of each and every elemental cross-axial section of the ring is greater than the resistance to decrease of diameter of the ring substantially as a unit whereby the ring decreases in diameter substantially as a unit decreasing the diameter of the bore thereof to such an extent as to bring the surface of said bore into substantial alignment with the surface of the bore of the tubular end of said other element, making and maintaining a sealed joint between the contact portion of the ring and the contact portion of the other element.

In testimony whereof I affix my signature.

WYLIE G. WILSON.